Nov. 22, 1938.    W. C. VAN GEEL ET AL    2,137,316
ELECTRODE SYSTEM AND METHOD OF MAKING SAME
Filed Feb. 6, 1936
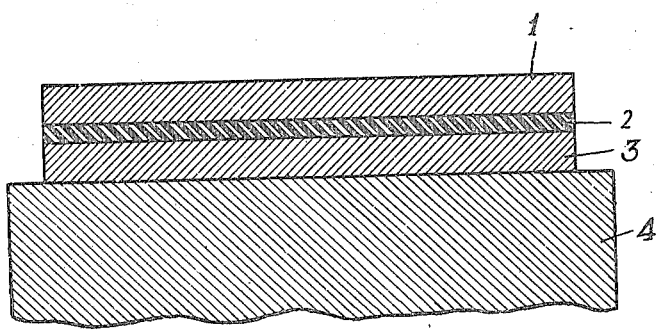
INVENTOR
WILLEM C. VAN GEEL
HENDRIK EMMENS
BY
ATTORNEY Patented Nov. 22, 1938

2,137,316

UNITED STATES PATENT OFFICE 2,137,316

ELECTRODE SYSTEM AND METHOD OF MAKING SAME

Willem Christian van Geel and Hendrik Emmens, Eindhoven, Netherlands, assignors to N. V. Philips' Gloeilampenfabrieken, Eindhoven, Netherlands Application February 6, 1936, Serial No. 62,639
In Germany February 6, 1935

14 Claims. (Cl. 175—366)

Our invention relates to electrode systems of asymmetrical conductivity, and more particularly to electrode systems comprising an electrode which consists substantially of selenium and is separated from a second and sufficiently-conductive electrode by an intermediate layer of insulating material.

To improve the conductivity of the selenium electrode, it has been proposed to add to the selenium, alkaline earth metals or alkaline metals such as sodium or lithium; the latter being sometimes present in selenium as impurities. It has also been proposed to add to the selenium, substances such as selenious oxide or a copper salt of ferro-hydrocyanic acid.

The object of our invention is to increase the conductivity of such selenium layers, and to provide an electrode system of asymmetrical conductivity which is not deleteriously affected by atmospheric conditions or chemical action.

In accordance with the invention, we add to the selenium an insulating metal salt or oxide as for instance, insulating stable metallic salts or oxides of the type which are difficultly soluble in water, and which retain their insulating properties when exposed to the atmosphere. The addition of such substances greatly increases the conductivity of the selenium—in many cases as much as a hundred times or more—and retain their insulating properties under atmospheric conditions.

Salts and oxides particularly suited for carrying out the invention, are, for example, barium sulphate ($BaSO_4$), calcium sulphate ($CaSO_4$), quartz ($SiO_2$), barium tungstate ($BaWO_4$), magnesia ($MgO$) alumina ($Al_2O_3$) and cryolite ($Na_3AlF_6$). Mixtures of these salts and oxides are also suitable for carrying out the invention.

As such salts or oxides are substantially or entirely insoluble in water, they prevent the degree of humidity of the atmosphere from deleteriously affecting the characteristic and operating asymmetric properties of the electrode system. This is particularly important when the asymmetric system is used as a detector, as detectors must be extremely stable and must not be affected by atmospheric conditions or chemical action.

To obtain the most favorable results and a very high increase of the conductivity of the selenium by the addition of such salts or oxides, it is necessary that these substances be uniformly present throughout the selenium layer and in as finely divided state as possible.

In a preferred form of our invention, the added insulating salts or oxides form at the same time the insulating or blocking layer between the selenium electrode and the conductive electrode; the latter consisting of a suitable metal, for instance Wood's metal. Such an arrangement obviates the necessity of providing a separate blocking layer and thereby simplifies the construction and the manufacture of such electrode systems as in this case the intermediate or blocking layer is automatically formed from the salts or oxides present in a finely-divided condition in the selenium layer.

In order that our invention may be clearly understood and readily carried into effect, we shall describe same more fully in connection with the accompanying drawing, in which the single figure is a sectionized view of an asymmetrically-conductive electrode system.

The electrode system shown in the figure comprises an electrode 1 of conductive material, for instance Wood's metal, an electrode 3 containing selenium and the added substance or substances according to the invention and an intermediate or blocking layer 2 which may be formed separately to the layer 3 or may be formed from the added substances contained therein.

An electrode system as shown in the figure, may be manufactured as follows: Selenium, in an amorphous condition, is mixed with the selected added substance or substances, in a suitable container, for example a mortar, and the mixture is ground so that the added substances are finely divided in the selenium. In such a ground condition the added substances should generally be reduced to a size less than 10 microns in diameter and preferably to from about 3 to 4 microns, and the amount by weight of the added substances should range generally from .5% to 5% of that of the selenium. For example, if barium tungstate ($BaWO_4$) is used, as the added substance, about 1% by weight of this substance gives excellent results.

Although barium sulphate—as far as its general properties are concerned—is very suitable for carrying out the invention, it is somewhat difficult to mix, due to the fact that it clots and cannot be readily pulverized. However, the pulverization of barium sulphate can be greatly facilitated by adding thereto, prior to the pulverization, sugar. The effect of sugar can be explained by the fact that sugar has very hard crystals which pulverize the clots of barium sulphate tending to form during the pulverization. The sugar can be readily removed from the barium sulphate selenium mixture subsequent to the pulverization, by pouring the mixture into water, in which the sugar dissolves whereas the selenium and barium sulphate do not. The selenium and barium sulphate are then separated from the sugar by filtering the aqueous solution.

The powdered mixture of selenium and barium sulphate or other suitable added substance is melted and then applied to a suitable support usually a plate 4 of metal such as iron or brass. To obtain the desired layer, the material is spread over the plate, for example, by means of a hot iron or roller, whereby a homogeneous layer having a uniform thickness of preferably about 0.03 mm., and generally not greater than 0.15 mm., is obtained. The so-formed layer is then cooled as completely and rapidly as possible. A rapid cooling is necessary to prevent the selenium from passing from its amorphous state into its metallic condition, which would slow down and unfavorably influence the next step of the process in which the layer is rendered conductive.

To render the layer conductive the plate, with the so-formed layer thereon, is heated in a furnace to a temperature of about 200° C., whereby the amorphous selenium is converted into its metallic (grey) semi-conductive modification. By repeating the steps of fusion, cooling, and subsequent heating, as well as the conversion of the selenium into the metallic modification, the homogenity of the layer can be greatly increased. To obtain a satisfactory conductivity, the heating may require from 2 to 24 hours or even longer.

Care must be taken to prevent the formation of a blocking layer between the selenium layer and its support, as this would deleteriously affect the proper action of the system. To prevent this, the support for the selenium electrode should be of a metal or alloy which, when the hot, semiconductive mixture is poured thereon, does not form a compound with the selenium, or, if it does form a compound, the compound should be conductive. For this purpose the support may be made of chromium or silver.

After the aggregate has been cooled, it is again placed for about 180 minutes in a furnace having a temperature of about 200° C. This heating serves to remove by vaporization, the top film from the selenium layer whereby a layer of insulating and not easily decomposable substances appears on the surface which, due to the insulating property of these substances, forms the intermediate or blocking layer 2.

The conductive electrode is subsequently applied to the selenium, but actually contacts with the blocking layer 2. The electrode 1 may consist, for example, of a readily fusible conductive metal alloy, which may be applied in a liquid condition, for instance, Wood's metal.

The advantages of using added substances which are decomposable, readily appears from the fact that otherwise when the alloy serving as the conductive electrode is being poured on, these substances under heat might form compounds which are conductive and such conductive compounds would unfavorably influence the operation of the electrode system. Furthermore, the advantage of the invention, namely that the insulating added substances also form the blocking layer, would be lost. Thus, for example, the copper salt of ferro-hydrocyanic acid used by the prior art readily decomposes at the high temperatures used in melting the selenium and is therefore unsuitable to obtain the desired results.

While we have described our invention in connection with specific examples and applications, we do not wish to be limited thereto but desire the appended claims to be construed as broadly as permissible in view of the prior art.

What we claim is:

1. An asymmetrically-conductive electrode system for rectifying or controlling high or medium frequency oscillations, comprising an electrode consisting substantially of selenium and an insulating metal salt or oxide difficultly soluble in water and retaining its insulating properties under atmospheric conditions, a second electrode of conductive material, and a layer of said insulating salt or oxide between said electrodes.

2. An asymmetrically-conductive electrode system comprising an electrode consisting substantially of selenium and an insulating salt or oxide having particles smaller than 10, said insulating salt or oxide being difficultly soluble in water and retaining its insulating properties under atmospheric conditions, a second electrode of conductive material, and a layer of said insulating material separating said electrodes.

3. An asymmetrically-conductive electrode system comprising an electrode consisting substantially of selenium and an insulating metal salt or oxide, the weight of the insulating material being from 0.5 to 5% of the weight of the selenium, said insulating material being difficultly soluble in water and retaining its insulating properties under substantially any atmospheric conditions, a second electrode of conductive material, and a layer of insulating material separating said electrodes.

4. A method of making an asymmetrically-conductive electrode system comprising the steps, forming a layer of selenium and an insulating metal salt or oxide which is difficultly soluble in water and retains its insulating properties under adverse atmospheric conditions, heating the layer to vaporize the top film therefrom and to expose thereon a blocking layer of said insulating salt or oxide, and applying to said blocking layer a readily-fusible conductive substance to form a conductive electrode.

5. A method of making an asymmetrically-conductive electrode system comprising the steps, applying to a metal plate a pulverized mixture of selenium and a difficultly-soluble insulating metal salt or oxide, heating the mixture above the melting point of selenium to obtain a homogeneous layer, rapidly cooling said layer, heating the layer to a temperature of about 200° C. to convert the selenium into its metallic (grey) semi-conductive modification, cooling the layer, heating the layer to vaporize the top film therefrom and to expose a blocking layer of said metal salt or oxide, and applying to the blocking layer, a layer of conductive material.

6. An asymmetrically-conductive electrode system for rectifying or controlling high or medium frequency oscillations comprising, an electrode consisting essentially of selenium and at least one of the insulating compounds of a group including barium sulphate, calcium sulphate, quartz, barium tungstate, magnesia, alumina and crytolite, said compound being in a finely divided state and distributed substantially uniformly throughout the selenium, a second electrode composed of conductive material and a layer of said insulating compound between the two electrodes.

7. In a dry rectifier cell, an electrode, composed substantially of selenium having uniformly distributed therein in a finely divided state at least one of the following group of insulating compounds: barium sulphate, calcium sulphate, quartz, barium tungstate, magnesia, alumina and crytolite, a second electrode of conducting material and a layer of insulating material separating the two electrodes.

8. In an asymmetrically-conductive electrode system, a first electrode composed substantially of selenium and barium tungstate, the weight of the barium tungstate being about 1% of the weight of the selenium a second electrode composed of conducting material, and a layer of insulating material separating said two electrodes.

9. In a dry rectifier cell, an electrode composed substantially of selenium and an insulating metallic oxide a second electrode composed of conducting material, and a layer of insulating material separating said two electrodes.

10. In a dry rectifier cell, an electrode composed essentially of selenium throughout which is substantially uniformly distributed between 0.5% and 5% of a finely divided insulating metallic oxide, the size of the particles of the finely divided insulating metallic oxide being not greater than 10 microns, a second electrode composed of conducting material and a layer of insulating material separating the two electrodes.

11. A method of constructing an electrode suitable for use in a dry rectifier cell which method consists in adding to a quantity of selenium in an amorphous state, between 0.5% and 5% by weight of an insultaing metallic oxide or salt, grinding and mixing the mixture so that the particles of the insulating metallic material are reduced to a size of the order of 5 microns in diameter and are uniformly distributed throughout the mixture, melting the resulting mixture and then spreading the molten mixture over a suitable metallic plate or support to form a homogeneous layer having a substantially uniform thickness of the order of 0.1 mm., completely cooling the layer thus formed sufficiently rapidly to prevent the selenium from passing from its amorphous state into its metallic condition, heating the layer and conductive plate to a temperature of about 200° C. for a period of time sufficient to convert the amorphous selenium into its metallic semi-conductive modification, thereafter cooling the layer and metallic plate and then heating the same to a temperature of about 200° C. for approximately 180 minutes or for a sufficiently long period of time to vaporize the top film from the selenium layer and thereby leave a thin coating or layer of insulating material on the surface of the layer.

12. An asymmetrically-conductive electrode system for rectifying or controlling high or medium frequency oscillations, comprising, two electrodes formed of substances having different electron emissivities insulated from each other by a comparatively thin intermediate layer of insulating metallic salt, one of said electrodes consisting substantially of selenium and an insulating metallic salt or oxide which is difficulty soluble in water and which retains its insulating properties under substantially any atmospheric conditions.

13. A dry rectifier cell comprising two outside layers formed of substances having different electron emissivities separated by a comparatively thin layer of insulating substance, one of said outside layers being composed of a metal having good electrical conducting characteristics, the other outside layer being composed essentially of metallic selenium mixed with an insulating metallic salt or oxide, said insulating layer being composed of a finely divided substance comprising at least one of a group of insulating substances including barium sulphate, calcium sulphate, quartz, barium tungstate, magnesia, alumina and crytolite.

14. A dry rectifier having two outside layers separated by a layer of insulating material, one of said outside layers being composed of high conducting material and the other of said outside layers being composed substantially of selenium having substantially uniformly distributed therein in a finely divided state an insulating metallic salt, said layer of insulating material being composed of said insulating metallic salt.

WILLEM CHRISTIAN van GEEL.
HENDRIK EMMENS.